United States Patent Office 2,981,738
Patented Apr. 25, 1961

2,981,738

HETEROCYCLIC NITROGEN DERIVATIVES OF BIS(p-DIALKYLAMINOPHENYL)METHANE

Frederick H. Kranz, Buffalo, N.Y., assignor to Allied Chemical Corporation, New York, N.Y., a corporation of New York No Drawing. Filed May 12, 1958, Ser. No. 734,428

11 Claims. (Cl. 260—308)

This invention relates to compounds which are derivatives of bis(p-dialkylaminoaryl)methane in which nitrogen is linked to the methane carbon atom. It relates more particularly to compounds of said type having superior properties as compared to known compounds of said general class.

An object of the present invention is to provide novel derivatives of bis(p-dialkylaminoaryl)methane, and especially of bis(p-dimethylaminophenyl)methane, in which the methane carbon atom thereof is linked to the nitrogen atom of a nitrogen-containing radical having a beneficial effect upon the properties of said derivatives.

A further object of the present invention is to provide novel bis(p-dialkylaminoaryl)methyl derivatives of said type which are lightly colored or substantially colorless but which when contacted with acidic electron acceptors produce colored compositions.

Another object of the present invention is to provide novel compounds of said type having superior stability as compared to N-bis(p-dimethylaminophenyl)methyl aniline (also known as N-phenyl leucoauramine) and derivatives of the latter when embodied in manifold record systems of the type disclosed in U.S. Patents 2,505,-470 and 2,548,366, for example.

Other objects of the invention will in part be obvious and will in part appear hereinafter.

It is known that N-phenyl derivatives of leucoauramine, e.g., N-bis(p-dimethylaminophenyl)methyl aniline, and such compounds as crystal violet lactone, when dissolved in non-polar solvents, such as, benzene, toluene or chlorinated biphenyl, and brought into contact with acidic electron acceptors such as kaolin, bentonite, attapulgite, silica gel, feldspar, pyrophyllite, halloysite, magnesium trisilicate, zinc sulphate, zinc sulfide, calcium fluoride, and calcium citrate, as well as organic acids such as tannic acid and benzoic acid, turn from colorless to a deep blue or violet shade.

Compounds which are derivatives of bis(p-dimethylaminophenyl)methane in which the nitrogen atom of a phenylamino radical replaces one of the methane hydrogen atoms, such as N-phenyl leucoauramine, are known compounds which are colorless or substantially colorless, but which constitute color-reactants of the electron donor type, since they turn blue on coming into absorptive contact with acidic electron acceptor materials such as acidic clays (for example, attapulgite, halloysite, kaolin and bentonite), as well as aluminum sulfate, zeolite material, silica gel, magnesium trisilicate, and zinc sulphide, among others. They have been proposed for use heretofore in solution in toluene or chlorinated biphenyl for printing in color on paper or other material coated or filled with such acidic materials. Thus, they have been proposed for use in so-called "colorless carbon papers," impact printing papers and duplicating manifold record systems; for example, of the type disclosed in U.S. Patent 2,505,470, wherein a solution of the N-bis(p-dimethylaminophenyl)methyl aniline is provided in the form of discrete particles in conjunction with a solid insulating material including an organic hydrophylic film-forming material and an acidic clay which, upon pressure by a stylus or impact, as by typewriter type, causes combination of the color-forming reactant which the clay and a resulting color mark; and, for example, of the type disclosed in U.S. Patent 2,548,366, wherein the rear surface of each top sheet of a series of overlying sheets is coated with a dispersion of a suitable solution of the N-bis(p-dimethylaminophenyl)methyl aniline in a rupturable hydrophilic colloid film, and the adjacent top surface of the next underlying sheet is coated or filled with an electron-acceptor acidic clay, so that pressure of a stylus or impact upon the top sheet causes color-formation on the surface containing the acidic clay at the points of pressure or impact.

I have discovered that a novel class of compounds, namely N-bis(p-dimethylaminophenyl)methyl derivatives of nitrogen-containing heterocyclic compounds, and related compounds, in which a hetero nitrogen atom of a nitrogen-containing unsaturated heterocyclic nucleus having at least 5 ring members and which is free from carbonyl groups adjacent to the nitrogen atom replaces one of the methane hydrogen atoms, possess superior properties which render them particularly useful in systems of the above type.

The compounds of the present invention are N-bis(p-dialkylaminoaryl)methyl derivatives of nitrogen-containing unsaturated heterocyclic compounds of said type in which the alkyl groups of the dialkylamino radical each have 1 to 5 carbon atoms and the aryl radicals are mononuclear aryl radicals. That is to say, they are heterocyclic derivatives of bis(p-di-lower alkylamino-mononuclear aryl) methane in which a hetero nitrogen atom, of a nitrogen-containing unsaturated heterocyclic nucleus having at least 5 ring members and which is free from carbonyl and sulfonyl groups adjacent to the nitrogen atom, is linked to the methane carbon atom, the alkyl groups of the dialkylamino radicals each have 1 to 5 carbon atoms, and the aryl radicals are mononuclear aryl radicals. They include compounds which in themselves are colored (containing chromophoric groups) and compounds which are lightly colored, or colorless, or substantially colorless (free from chromophoric groups). Further, they include compounds which include in their molecules acidic groups containing a hydrogen cation (for example, a sulfonic acid or carboxylic acid radical), and compounds free from such acidic groups. In this connection it is noted that groups which do not contain a hydrogen cation, such as salts of acidic groups (e.g., alkali metal, ammonium, organic base and other salts of carboxylic and sulfonic acids) are included herein as being free from acid groups containing a free hydrogen cation.

Preferred compounds of the present invention are free from both chromophoric groups and from acidic groups containing a hydrogen cation, since such preferred compounds are lightly colored or substantially colorless or colorless in the solid form (leuco form), which renders them of special utility in the manufacture of impact printing and duplicating materials of the type referred to above.

The alkyl radicals of the p-dialkylamine radicals are lower alkyl radicals, including methyl, ethyl, propyl, butyl and amyl radicals. Compounds in which they are methyl or ethyl are preferred.

The mononuclear aryl radicals include unsubstituted phenylene radicals and phenylene radicals containing one or more inert substitutents such as alkyl, alkoxy, halogen, or acylamino substituents; for example, tolylene, methoxyphenylene, chlorophenylene, bromophenylene, etc. Compounds in which they are mononuclear aryl hydrocarbon radicals, and especially phenylene, are preferred.

The nitrogen-containing unsaturated heterocyclic radicals of the present invention include various types of nitrogen-containing heterocyclic radicals in which at least one hetero nitrogen atom, which forms the linking point of the radical, is part of a heterocyclic nucleus which contains at least one double bond, at least 5 ring members (and preferably 5 to 6 ring members), and which is free from carbonyl and sulfonyl groups adjacent to said nitrogen atom. Thus, they include unsaturated heterocyclic radicals which contain, besides nitrogen and carbon atoms, oxygen, sulfur and/or additional nitrogen atoms as hetero components. Preferably they contain at least two hetero nitrogen atoms, and especially two adjacent hetero nitrogen atoms. They also include condensed polynuclear radicals of which one is a nitrogen-containing heterocyclic radical having the said structure; and they include radicals in which hydrogen atoms of the heterocyclic nucleus are replaced by substituent atoms or groups. Preferably they are free from chromophoric groups and from acidic groups containing a hydrogen cation, which would interfere with their use as leuco electron-donor color reactants. They may, however, contain such substituents as alkyl, aralkyl, hydroxyalkyl, alkoxy, hydroxyalkoxy, aryl, aroxy, halogen, dialkylamino, acylamino and sulfonamido groups.

The N - bis(p - dialkylaminoaryl)methyl heterocyclic compounds of the present invention have the formula

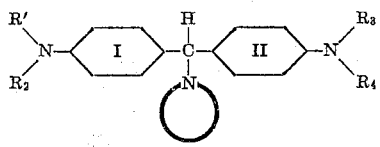

wherein $R^1$, $R^2$, $R^3$ and $R^4$ are each an alkyl radical having 1 to 5 carbon atoms (such as, methyl, ethyl, propyl, butyl or amyl),

represents a nitrogen-containing heterocyclic radical in which the nitrogen atom which forms the linking point of said radical is part of a heterocyclic nucleus which contains at least one double bond, at least 5 ring members (and preferably 5 to 6 ring members), and which is free from carbonyl and sulfonyl groups adjacent to said nitrogen atom, such as, benzotriazolyl, pyrazolyl, imidazolinyl, benzimidazolyl, N-hydroquinolyl, carbazolyl or pyrrolyl radicals, including substituted derivatives of such radicals and preferably those free from chromophoric groups and from acidic groups containing a hydrogen cation, such as the alkyl (e.g. methyl, ethyl, propyl, butyl, amyl, hexyl, octyl, dodecyl, hexadecyl, octadecyl or octadecenyl), cycloalkyl (e.g. cyclopentyl, cyclohexyl or methyl cyclohexyl), alkoxy, hydroxyalkyl, hydroxyalkoxy, fluorine, chlorine, bromine, nitro, aryl, aroxy, dialkylamino, acylamino, sulfamido or condensed cyclic derivatives of the radicals referred to above, and

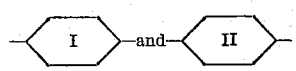

are selected from the group consisting of the phenylene radical and substituted derivatives thereof, preferably those free from chromophoric groups and from acidic groups containing a hydrogen cation (such as the alkyl, alkoxy, fluorine, chlorine, bromine, dialkylamino, acylamino or sulfamido derivatives thereof).

Examples of such compounds are:

1-[bis(p-dimethylaminophenyl)methyl]-benzotriazole
1-[bis(p-dimethylaminophenyl)methyl]-3,5-dimethyl-pyrazole
1-[bis(p-dimethylaminophenyl)methyl]-benzimidazole
N-[bis(p-dimethylaminophenyl)methyl]-indole
N-[bis(p-dimethylaminophenyl)methyl]-pyrrole
1-[bis(p-dimethylaminophenyl)methyl]-2-methyl-2-imidazoline.

Those compounds are of particular value in which $R^1$, $R^2$, $R^3$ and $R^4$ are methyl or ethyl, the phenylene radicals are mononuclear aryl hydrocarbon radicals and

is benzotriazole, 3,5-dimethylpyrazole, or pyrazole.

The compounds of the present invention are soluble in a wide variety of organic solvents. Thus, they have good solubility in the usual solvents such as benzene, toluene, dioctylphthalate and chlorinated biphenyls. When applied as a solution in such solvents to paper or other material coated with an acidic material, such as bentonite, kaolin, felspar, mono- or dibasic barium or calcium phosphates, tannic acid or benzoic acid, they produce generally blue to violet colorations; and the colored combinations thus formed are stable and fast to light. In addition, they possess relatively low volatility and high stability to air and light. These advantageous properties render the lightly colored to colorless compounds of the present invention outstanding for use in systems of the above type.

Thus, the compounds of the present invention are useful in the formation of colored compounds or differently colored compounds by contact with electron acceptor or acidic materials which cause a rearrangement of the chemical molecule of compounds of said class with intensification of the color thereof, such as those enumerated above.

Lightly colored, and especially colorless or substantially colorless, compounds of this invention are particularly useful in so-called "colorless carbon papers" and duplicating manifold record systems of the type referred to above, because of their superior solubility and stability both in the leuco form and in the colored form obtained by contact with an acidic electron acceptor. Thus, in the leuco form they are stable to storage in containers open to the atmosphere, as well as when incorporated into record sheets of the type disclosed in U.S. Patents 2,548,366 and 2,712,507 and exposed to the atmosphere and to light. In the form of colored compounds formed by contact with acidic electron acceptors of the type referred to above, they are stable to light and to the atmosphere, even when embodied as record sheet material exposed to daylight. This is in contrast to N-phenyl leucoauramine and related compounds, which when incorporated into record sheet material of the type disclosed, for example, in U.S. Patents 2,548,366 and 2,712,507, are unstable and/or volatilize or rapidly become ineffective; and in contrast to the rapid fading of the color produced by contact of acidic clays with crystal violet lactone heretofore employed commercially. Further, they do not stain the skin when the record sheets are handled.

For example, when the compound of Example 1 of the present application is substituted for the mixture of crystal violet lactone and methylene base employed in Example 1 of U.S. Patent 2,548,366, the resulting sheets are stable during storage for long periods of time and when placed one above the other, with the clay-coated surfaces upward, and marked with a stylus, an intense reddish blue marking is instantly developed on the clay-coated surface of the lower sheet where pressure was applied, which marking does not fade.

The compounds of the present invention can be prepared in various ways. The simplest method from the standpoint of availability of starting materials and apparatus required involves the condensation of a bis(p-dialkylaminoaryl)methyl hydrol having the formula

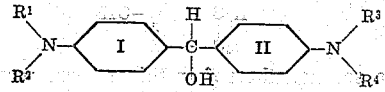

with a nitrogen-containing unsaturated heterocyclic compound having a hydrogen atom attached to at least one hetero nitrogen atom, having at least 5 ring members and which is free from carbonyl and sulfonyl groups adjacent to said nitrogen atom, and having the formula

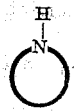

wherein $R^1$, $R^2$, $R^3$, $R^4$

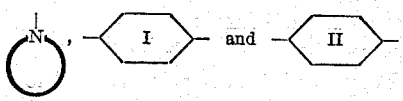

have the meaning given above, preferably in substantially equimolar amounts. The condensation is preferably carried out by heating in a solvent at a temperature between 80° and 150° C. (All ranges given herein, including the claims, are inclusive of the limits.)

The general method of preparation preferably consists in refluxing substantially equimolecular proportions of the benzhydrol and of the heterocyclic compound in a suitable solvent having a boiling point between 80° and 150° C., at least a fraction of each of the two reactants being soluble in the solvent. Suitable solvents are for example, hydrocarbon solvents, such as petroleum hydrocarbons (such as 2,2,4-trimethylpentane and low boiling kerosene fractions), aromatic hydrocarbons (such as benzene, toluene or xylene), and mixtures preferably having a boiling range between 80° and 150° C., and alcohols, such as ethyl, propyl or butyl alcohols or mixtures thereof. When effected in a hydrocarbon solvent, water formed in the reaction is preferably removed. The N - bis(p - dialkylaminoaryl)methyl heterocyclic compounds thus obtained may be purified by recrystallization from a suitable solvent.

The following are illustrative of hydrols which are suitable for use in the process:

Michler's hydrol: 4,4'-bis(dimethylamino)benzhydrol
4,4'-bis(diethylamino)benzhydrol
4,4'-bis(dipropylamino)benzhydrol
4,4'-bis(dibutylamino)benzhydrol
4,4'-bis(dimethylamino)-2,2'-dichloro-benzhydrol
4,4'-bis(dimethylamino)-3,3'-dimethyl-benzhydrol
4,4'-bis(diethylamino)-2,2'-dibromo-benzhydrol.

The following are illustrative of heterocyclic nitrogen compounds which are suitable for use in the process, alone or in the form of mixtures of two or more of them:

Benzotriazole
3,5-dimethylpyrazole
2-methyl-2-imidazoline
Benzimidazole
Carbazole
Indole
Pyrrole
1,2,3,4-tetrahydro-quinoline The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

*Example 1*

In a round-bottom, three-necked flask, equipped with a stirrer, thermometer, and reflux condenser, were charged in the following order 60 parts of Michler's hydrol (commercial grade, 90% strength, equivalent to 0.2 mol. 100%)
23.82 parts of benzotriazole (equivalent to 0.2 mol)
550 parts by volume of ethyl alcohol (2B denatured)
0.5 part by volume of ammonium hydroxide (28%).

The mixture was heated to boiling and refluxed (80°) for 48 hours. The slurry of crystals thus obtained was cooled to room temperature, filtered and washed with 100 parts by volume of the ethyl alcohol. The washed crystals were dried in vacuo.

The crude bis (p-dimethylaminophenyl)-benzotriazyl methane thus obtained was in the form of pale yellow crystals having a melting point of 162–165°. It corresponds to the formula:

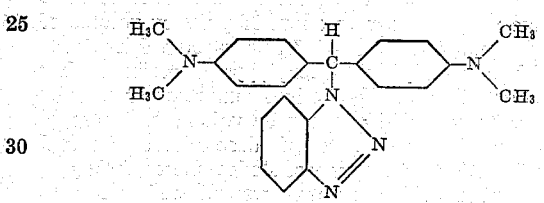

When a solution thereof in toluene was poured onto a surface coated with attapulgite a deep blue coloration was produced within a few seconds.

*Example 2*

A mixture of 30 parts of Michler's hydrol (90% strength), 9.6 parts of 3,5-dimethyl pyrazole and 175 parts by volume of ethyl alcohol (2B) was heated to boiling and refluxed (80–81°) for 50 hours in an apparatus of the type employed in Example 1. The reaction mass was then cooled to room temperature and filtered. The filter-cake was washed with 25 parts by volume of the alcohol and dried in a vacuum drier at 40–45°.

The crystalline bis(p-dimenthylaminophenyl)-3,5-dimethylpyrazolyl methane thus obtained was colorless and had a melting point of 185°. It corresponds to the formula:

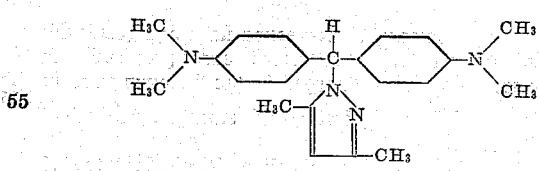

When a small amount was dissolved in a mixture of 9 volumes to toluene and 1 volume of chlorinated biphenyl and poured onto a surface coated with bentonite clay, a reddish purple spot was obtained immediately.

*Example 3*

The following were charged to an apparatus of the type employed in Example 2:

30 parts of Michler's hydrol (90% strength)
11.7 parts of indole
175 parts by volume of alcohol (2B).

The mixture was heated to boiling and refluxed (78–79°) for 50 hours. The reaction mass was then cooled to room temperature and filtered. The filter-cake was washed with 25 parts by volume of the alcohol and dried in a vacuum drier at 40–45°.

The crystalline bis(p-dimethylaminophenyl)indolyl methane thus obtained was colorles and melted at 240–242°. It corresponds to the formula:

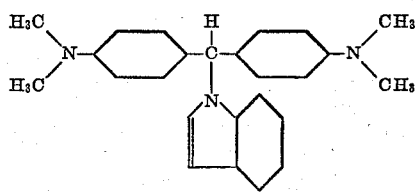

When a solution thereof in a mixture of 9 volumes of toluene and 1 volume of a chlorinated biphenyl ("Arochlor 1242") was poured onto a surface coated with bentonite clay, a blue spot was obtained.

*Example 4*

A mixture of 30 parts of Michler's hydrol (90% strength), 6.7 parts of pyrrole, and 200 parts by volume of ethyl alcohol (2B) was heated to boiling and refluxed (79°) for 50 hours. The mixture was then allowed to cool overnight to room temperature and filtered. The filter-cake was washed with about 25 parts by volume of the alcohol and dried at 35–40° in a vacuum drier. The crude bis(p-dimethylaminophenyl)pyrryl methane thus obtained was dissolved in a boiling mixture of 50 parts by volume of toluene and 40 parts by volume of isopropyl alcohol containing 2 parts of decolorizing charcoal (Nuchar), and the hot mass was sludge-filtered through a bed of dry filter cel. The filtrate was allowed to cool to room temperature to crystallize, the crystallized product was filtered off, and the filter-cake was dried in vacuum at 35–40°.

The crystalline product thus obtained was essentially colorless and melted at 181°. It corresponds to the formula:

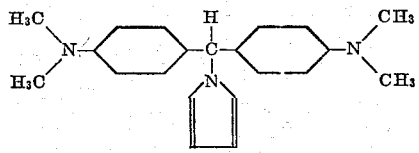

When a solution thereof in toluene was poured onto paper coated with bentonite clay, a light blue coloration gradually formed.

*Example 5*

Into a round bottom, three-necked flask equipped with a stirrer, thermometer and reflux condenser provided with a water separator, were charged in the following order:

30 parts of Michler's hydrol (90% strength, equivalent to 0.1 mol)
8.4 parts of 2-methyl-2-imidazoline (equivalent to 0.1 mol)
57.3 parts by volume of benzene
142.7 parts by volume of toluene
5.7 parts by volume of glacial acetic acid.

The mixture was heated at 98 to 102° and agitated at that temperature for 20 hours. The reaction mass was cooled to 10° and 5 parts of soda ash dissolved in 15 parts by volume of hot water were added. The mass was poured into a separatory funnel and the water layer drawn off. The oil in the funnel was then washed three times with 150 parts by volume of warm water each. The washed oil was evaporated in vacuo until only a friable, but sticky product remained. This was dissolved in a mixture of three parts of a paraffin hydrocarbon mixture of boiling range 40–127° (Sovasol #1) and one part isopropyl alcohol. This solution was filtered and the filtrate dried in a vacuum at ambient temperature. The residue was a slightly yellow resinous product, bis(p-dimethylaminophenyl)(2-methyl-2-imidazolinyl)methane having the formula

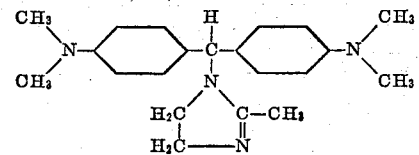

When a solution thereof in toluene was poured onto attapulgite clay, a deep reddish blue color was produced instantly.

*Example 6*

Into a round bottom, three-necked flask equipped with a stirrer, thermometer, and reflux condenser provided with a water separator, were charged in the following order:

60 parts of Michler's hydrol (90% strength, equivalent to 0.2 mol)
33.4 parts of carbazole (equivalent to 0.2 mol)
178 parts by volume of toluene
72 parts by volume of benzene
5.7 parts by volume of glacial acetic acid.

The mixture was heated to reflux at 100° to 104° and agitated at this temperature for 24 hours. The reaction mass was allowed to cool to room temperature and the resulting crystals were filtered off and washed with 25 parts by volume of toluene. The filter cake was dissolved in 200 parts by volume of boiling toluene and sludge filtered, and the filtrate was cooled to 0°. The crystals obtained were filtered off and dried at 30–35° in vacuum.

The bis(p-dialkylaminophenyl)-9-carbazolyl methane thus obtained had a melting point of 186°. A solution of this product in toluene, when poured onto bentonite, initially gave a green color which gradually became a deep blue of slightly reddish cast.

It will be evident to those skilled in the art that the invention is not limited to the details of the foregoing illustrative examples and that changes can be made without departing from the scope of the invention.

Thus, instead of the hydrols and hetrocyclic nitrogen compounds employed in the examples, others of those specified above may be substituted in equivalent amounts. Further, instead of the hydrol, the corresponding bis(p-dialkylaminoaryl)methyl chloride or bromide may be used.

The Michler's hydrol employed in Example 1 was a technical product containing mineral acid impurities. Accordingly the process includes the addition of a small amount of ammonium hydroxide to neutralize said impurities. Other neutralizing agents can be used similarly, such as sodium carbonate or hydroxide.

I claim:
1. Heterocyclic derivatives of bis(p-dialkylaminoaryl)-methane having the formula

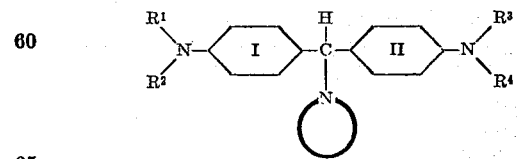

wherein $R^1$, $R^2$, $R^3$ and $R^4$ are individually selected from the group consisting of alkyl radicals having 1 to 5 carbon atoms,

represents a nitrogen-containing heterocyclic radical in which the nitrogen atom which forms the linking point of said radical to the methane carbon atom is part of a heterocyclic nucleus which contains at least one double bond, 5 to 6 ring members, and 1 to 3 nitrogen atoms; said nitrogen-containing heterocyclic radical being selected from the group consisting of those which are free from substituents and those which contain 1 to 2 substituents selected from the group consisting of alkyl up to 18 carbon atoms; octadecenyl; cycloalkyl in which the ring contains 5 to 6 carbon atoms; lower alkyloxy; lower hydroxyalkyl; lower hydroxyalkoxy; phenyl-lower alkyl; mononuclear hydrocarbon aryl; mononuclear hydrocarbon aroxy; benzo; fluorine; chlorine; bromine; nitro; di-lower alkylamino; lower alkanoylamino and —$SO_2NH_2$, and

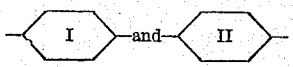

are selected from the group consisting of the unsubstituted phenylene radical and the phenylene radical monosubstituted by a member of the group consisting of lower alkyl, lower alkoxy, fluorine, chlorine, bromine, di-lower alkylamino, lower alkanoylamino and —$SO_2NH_2$.

2. Bis(p-dimethylaminophenyl)methane in which one hydrogen atom of the methane carbon atom is unsubstituted and the other hydrogen atom is substituted by a heterocyclic radical which consists of carbon atoms, hydrogen atoms and one nitrogen atom, said nitrogen atom forming the linking point of said radical to the methane carbon atom and being part of a heterocyclic ring which contains at least one double bond and 5 ring members, the other ring members being carbon atoms.

3. Bis(p-dimethylaminophenyl)methane in which one hydrogen atom of the methane carbon atom is unsubstituted and the other hydrogen atom is substituted by a heterocyclic radical which consists of carbon atoms, hydrogen atoms and one nitrogen atom, said nitrogen atom forming the linking point of said radical to the methane carbon atom and being part of a heterocyclic ring which contains at least one double bond and 6 ring members, the other ring members being carbon atoms.

4. Bis(p-dimethylaminophenyl)methane in which one hydrogen atom of the methane carbon atom is unsubstituted and the other hydrogen atom is substituted by a heterocyclic radical which consists of carbon atoms, hydrogen atoms and two nitrogen atoms, said nitrogen atoms being part of a heterocyclic ring which contains at least one double bond and 5 ring members, the other ring members being carbon atoms, and one of said nitrogen atoms forming the linking point of said radical to the methane carbon atom.

5. Bis(p-dimethylaminophenyl)methane in which one hydrogen atom of the methane carbon atom is unsubstituted and the other hydrogen atom is substituted by a heterocyclic radical which consists of carbon atoms, hydrogen atoms and two nitrogen atoms, said nitrogen atoms being adjacent parts of a heterocyclic ring which contains at least one double bond and 5 ring members, the other ring members being carbon atoms, and one of said nitrogen atoms forming the linking point of said radical to the methane carbon atom.

6. Bis(p-dimethylaminophenyl)methane in which one hydrogen atom of the methane carbon atom is unsubstituted and the other hydrogen atom is substituted by a heterocyclic radical which consists of carbon atoms, hydrogen atoms and three nitrogen atoms, said nitrogen atoms being part of a heterocyclic ring which contains at least one double bond and 5 ring members, the other ring members being carbon atoms, and one of said nitrogen atoms forming the linking point of said radical to the methane carbon atom.

7. 1 - [bis(p-dimethylaminophenyl)methly] benzotriazole.

8. 1 - [bis(p - dimethylaminophenyl)methyl] 3,5 - dimethylpyrazole.

9. 1 - [bis(p-dimethylaminophenyl)methyl] benzimidazole.

10. N-[bis(p-dimethylaminophenyl)methyl] indole.

11. 1 - [bis(p-dimethylaminophenyl)methyl] 2-methyl-2-imidazoline.

References Cited in the file of this patent

UNITED STATES PATENTS

| | | |
|---|---|---|
| 1,155,878 | Waldmann | Apr. 25, 1939 |
| 2,233,805 | Broderson et al. | Mar. 4, 1941 |
| 2,361,329 | Stenzl et al. | Oct. 24, 1944 |
| 2,547,307 | Craig | Apr. 3, 1951 |
| 2,701,799 | D'Amico | Feb. 8, 1955 |
| 2,708,197 | Speeter | May 10, 1955 |
| 2,900,388 | Tien | Aug. 18, 1959 |

OTHER REFERENCES

Bogert et al.: J. Am. Chem. Soc., vol. 44, pp. 2612–21 (1922).